United States Patent [19]

Tsuyama et al.

[11] Patent Number: 5,351,192
[45] Date of Patent: Sep. 27, 1994

[54] SLIPPAGE CONTROL SYSTEM USING ESTIMATED ROAD SURFACE RESISTANCES

[75] Inventors: Toshiaki Tsuyama, Higashihiroshima; Toru Onaka, Hiroshima, both of Japan

[73] Assignee: Mazda Motor Corporation, Hiroshima, Japan

[21] Appl. No.: 997,486

[22] Filed: Dec. 28, 1992

[30] Foreign Application Priority Data

Dec. 25, 1991 [JP] Japan .................... 3-357243

[51] Int. Cl.⁵ .................... B60K 26/00; B60T 8/34
[52] U.S. Cl. .................... 364/426.03; 364/426.01; 364/426.02; 303/100; 180/197
[58] Field of Search .................... 364/426.03, 426.02, 364/424.05, 426.01; 73/9, 105, 460, 65; 180/197, 201; 303/97, 100, 113.2; 280/707

[56] References Cited

U.S. PATENT DOCUMENTS

| | | | |
|---|---|---|---|
| 4,761,022 | 8/1988 | Ohashi et al. | 280/772 |
| 4,794,538 | 12/1988 | Cao et al. | 364/426.02 |
| 4,947,332 | 8/1990 | Ghoneim | 364/426.03 |
| 5,132,906 | 7/1992 | Sol et al. | 364/426.02 |
| 5,172,319 | 12/1992 | Shiraishi et al. | 364/426.03 |
| 5,212,640 | 5/1993 | Matsuda | 364/424.03 |
| 5,216,608 | 6/1993 | Ito et al. | 364/426.03 |
| 5,218,541 | 6/1993 | Sakakibara et al. | 364/424.01 |
| 5,224,766 | 6/1993 | Oikawa et al. | 303/100 |

FOREIGN PATENT DOCUMENTS

60-99757  6/1985  Japan .

Primary Examiner—Thomas G. Black
Assistant Examiner—Tan Q. Nguyen
Attorney, Agent, or Firm—Keck, Mahin & Cate

[57] ABSTRACT

A vehicle slippage control system has wheel drive torque controlled so as to prevent drive wheels from excessively slipping on a road and is regulated in accordance with road surface resistances. The system estimates lateral and rectilinear road surface resistances on the basis of lateral and rectilinear gravitational acceleration of the vehicle, respectively, and then selects one of the estimated lateral and rectilinear road surface resistances, on the basis of predetermined terms, as an effective road surface resistance in accordance with which wheel drive torque is changed.

21 Claims, 6 Drawing Sheets

SLIPPAGE CONTROL SYSTEM USING ESTIMATED ROAD SURFACE RESISTANCES

BACKGROUND OF THE INVENTION

1. Field of the Invention

This invention relates to a slippage control system for an automotive vehicle.

2. Description of Related Art

In recent years, automotive vehicles have been equipped with slippage control systems called traction control devices, in which wheel drive torque is reduced during acceleration so as to prevent excessive slippage of the driving wheels on the road surface. The reduction of wheel drive torque ordinarily results from at least one of a reduction in engine torque and a reduction in brake force applied to the drive wheels. Such slippage control is accomplished through the implementation of changes which correspond to changes in a road surface friction factor or resistance. For instance, a threshold value of slippage is changed so as to conduct or initiate the slippage control more easily as the road friction factor $\mu$ becomes lower or, otherwise, a target value of slippage of the drive wheels is made lower as the road friction factor $\mu$ becomes lower.

In this regard, changes in the nature of slippage control require the estimations of road surface friction factors, for which there are a number of estimation methods. For example, Japanese Unexamined Patent Publication 60-99757 reveals the estimation of a road surface friction factor made on the basis of driven wheel speed while a slippage control is in effect.

Heretofore, while estimating road surface resistance, an accurate estimation of road surface resistance is very difficult. A favorable, accurate estimation of road surface resistance with high responsiveness has been developed by conducting an estimation of road surface resistance on the basis of rectilinear gravitational acceleration of the vehicle during the implementation of vehicle slippage control. However, it has been also found that, depending upon vehicle running conditions, great errors may occur in the estimation of road surface resistance based on rectilinear gravitational acceleration of the vehicle.

Specifically, considering that the vehicle ordinarily turns circularly on a road which has a high surface resistance, since rectilinear gravitational acceleration acting on the vehicle may be zero (0), or close to zero (0), the road must be estimated to have a low surface resistance. Therefore, the drive wheel torque is considerably reduced, as being unnecessary. This results in a feeling of stalling or speed dropping.

SUMMARY OF THE INVENTION

It is therefore an object of the present invention to provide a slippage control system for an automotive vehicle in which road surface resistance can be estimated with high accuracy so as to perform good slippage control corresponding to the road surface resistance.

The foregoing object of the present invention is accomplished by providing a slippage control system for an automotive vehicle, in which drive wheel torque, i.e., engine output torque to drive wheels, is controlled to prevent the drive wheels from slipping in excess on a road and is regulated in accordance with road surface resistance. The slippage control system includes a control means to estimate first or lateral and second or rectilinear road surface resistances, acting laterally and axially on the vehicle, respectively. Such an estimation is made on the basis of lateral and rectilinear gravitational acceleration of the vehicle. The higher of the estimated first and second road surface resistances, is selected for use in slippage control on the basis of such predetermined terms as an effective road surface resistance with which drive wheel torque is regulated.

According to this invention, lateral and rectilinear road surface resistances are estimated based on lateral and rectilinear gravitational acceleration of the vehicle, respectively, one of which is selected for use in slippage control in accordance with specific selection criteria so as to reflect actual road surface conditions. Such a selection of road surface resistance offers favorable slippage control.

If there occurs a considerable error or deviation in the second or rectilinear road surface resistance estimated on the basis of rectilinear gravitational acceleration with respect to the actual road surface resistance, the second road surface resistance is ordinarily estimated to be lower than the actual road surface resistance likely when the vehicle is turning. On the other hand, when such a considerable error or deviation occurs, the first road surface resistance estimated based on the lateral gravitational acceleration reflects the actual road surface resistance with nigh accuracy. For this reason, selecting that one of the lateral and rectilinear road surface resistances which is greater than the other provides an effective road surface resistance accurately reflecting the actual road surface resistance, and the first or lateral road surface resistance is preferably selected when the vehicle is turning because it tends to be more accurate and correlated to the actual road surface resistance. With this in mind, it is preferable to select the first or primary road surface resistance $\mu$ when turning.

When the vehicle is under particular running conditions, such as when the vehicle spins, i.e., slides sideways or drifts laterally, when the driven wheels are locked, and when slippage of the drive wheels is exceptionally great, the accurate estimation of road surface resistance is difficult. In such circumstances, it is preferable to use a road surface resistance which has been estimated as an effective resistance prior to occurrence of the specific or exceptional running condition. In other words, the road surface resistance selected earlier should be used as a current road surface resistance.

BRIEF DESCRIPTION OF THE DRAWINGS

The above and other objects and features of the present invention will be clearly understood from the following detailed description of preferred embodiments when considered in conjunction with the accompanying drawings, in which.

DETAILED DESCRIPTION OF THE PREFERRED EMBODIMENT

Figure 1:
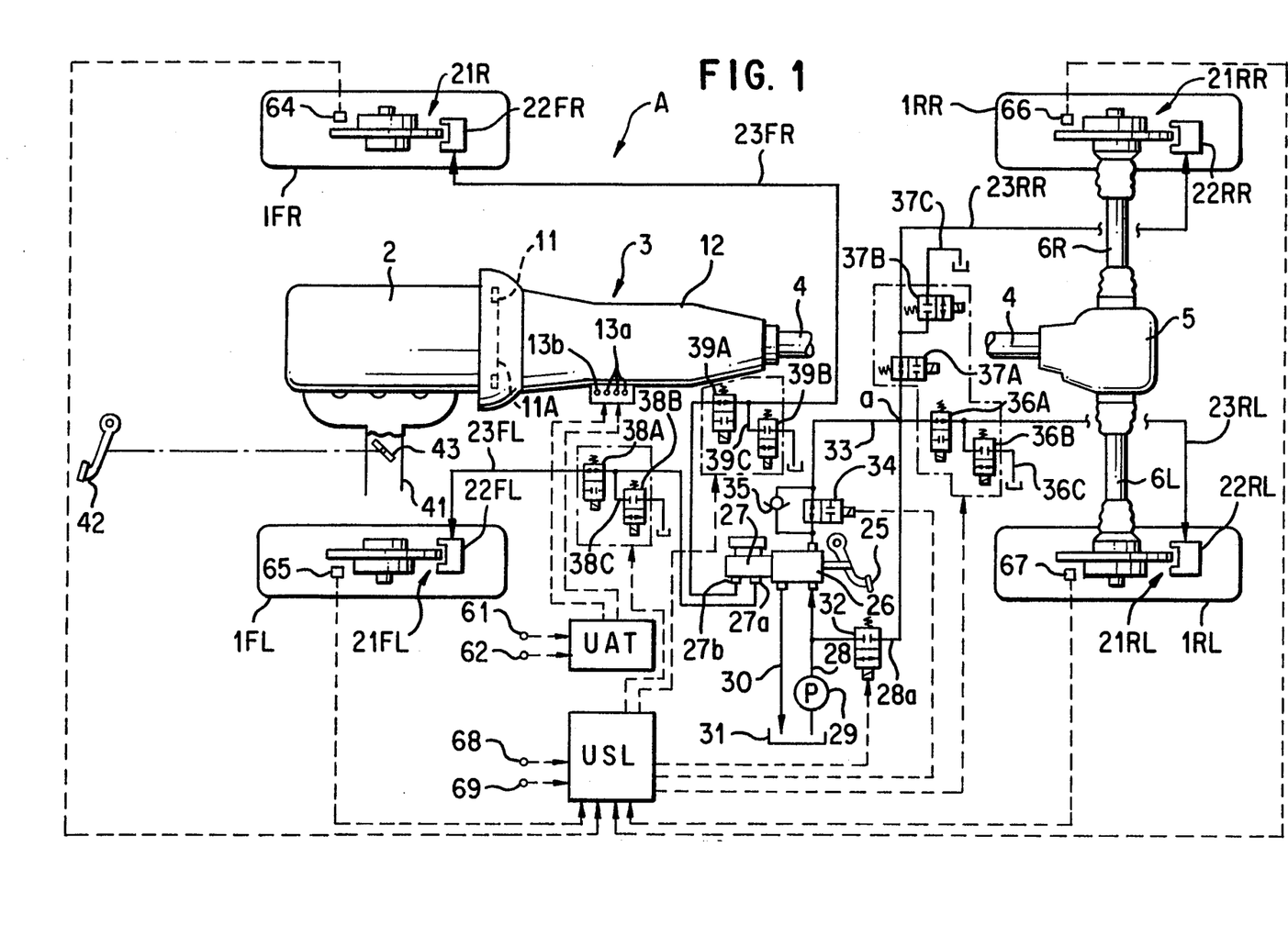
FIG. 1 is a schematic illustration showing a slippage control system in accordance with a preferred embodiment of the present invention.

Referring to the drawings in detail and, in particular, to FIG. 1, an automobile vehicle A has right and left front driven wheels 1FL and 1FR and left and right rear drive wheels 1RL and 1RR. Torque produced by an engine 2 mounted in a front engine compartment (not shown) of the vehicle is transmitted to the left rear drive wheel 1RL through an automatic transmission 3, a propeller shaft 4 and a differential 5, and then through the left drive axle 6L, and is also transmitted to the right rear drive wheel 1RR but through the right drive axle 6R. The automatic transmission 3 is composed of a torque converter 11 and a multiple stage gear mechanism 12. Speed changes are accomplished by selectively activating and de-activating a plurality of solenoids 13a which are assembled or built in a gear control hydraulic pressure circuit of the gear mechanism 12. In addition, the torque converter 11 is endowed with a hydraulic controlled lock-up clutch 11a, and is locked and unlocked by activating and de-activating solenoids 13a and 13b assembled or built in a clutch control hydraulic pressure circuit.

The solenoids 13a and 13b are controlled by means of an automatic transmission control unit UAT. As is well known in the art, the automatic transmission control unit UAT contains data representative of speed change characteristics and lock-up characteristics, on the basis of which automatic speed change control and automatic lock up control is accomplished. For this automatic control, the control unit UAT is input with a signal representative of throttle opening of a throttle valve 43, coupled with an accelerator pedal 42 and arranged in an air intake line 41, which is provided by a throttle opening sensor 61. The control unit UAT also receives a signal representative of a rotational speed of, for instance, the propeller shaft 4 as a vehicle speed from a vehicle speed sensor 62.

The front and rear wheels 1FR-1RR are attached with brakes 21FR-21RR, respectively. To respective calipers or brake cylinders 22FR-22RR of the brakes 21FR-21RR, brake fluid pressure is supplied through brake lines 23FR-23RR, respectively. Depressed force of a brake pedal 25 is multiplied by a force multiplying means 26, such as a hydraulic booster, and is transmitted to a tandem type of master cylinder 27. The fluid pressure transmitted to the master cylinder 27 is respectively transmitted to a left front wheel brake 21FL through the brake fluid line 23FL which is connected to a first outlet 27a of the master cylinder 27, and to a right front wheel brake 21FR through the brake fluid line 23FR connected to a second outlet 27b of the master cylinder 27.

Pressurized fluid from a pump 29 passes through a fluid line 28, and is supplied to the force multiplying means 26. Excessive fluid is returned to a reserve tank 31 through a return fluid line 30. A branch fluid line 28a branches off from the fluid line 28. An electromagnetic valve 32, which serves as a TRC valve, is connected to the branch fluid line 28a. In addition, a fluid line 33 branches off from the multiplying means 26. To the fluid line 33 is connected an electromagnetic open-shut valve 34 and a one way valve 35 which is arranged in parallel with the open-shut valve 34. The branch fluid line 28a and the fluid line 33 merge at a merge point a, and the left and right rear wheel brake lines 23RL, 23RR are connected to the fluid line at the merge point a. To the brake lines 23RL, 23RR, 23FL and 23FR, electromagnetic open-shut valves 36A, 37A, 38A and 39A are connected, respectively, and to the relief lines 36C, 37C, 38C and 39C leading downstream from the open-shut valves 36A, 37A, 38A and 39A, electromagnetic open-shut valves 36B, 37B, 38B and 39B, respectively, are connected. Each of the valves 32, 34, 36A, 37A, 38A, 39A, 36B, 37B, 38B and 39B is controlled by a control unit USL in order to accomplish an anti-skid brake control, i.e., a control to prevent lock-up of the wheel during braking. In other words, if both slippage control or traction control and anti-skid control are exercised, the valves 32, 36B, 37B, 38B and 39B are closed, and the valves 34, 36A, 37A, 38A, and 39A are open, as shown in FIG. 1. By this, when the brake pedal 25 is depressed, brake fluid is supplied to the front wheel brakes 21FR and 21FL through the master cylinder 27. In addition, brake fluid of the multiplying means 26 is supplied as brake fluid to the rear wheel brakes 21RR and 21RL through the fluid line 33.

When slippage control or traction control is accomplished with respect to the rear drive wheels 1RR and 1RL, the valve 34 is closed, and the valve 32 is open. By means of duty controlling the valves 36A, 36B, 37A and 37B, the brake fluid pressure is maintained, increased, and reduced. Practically speaking, as long as the valve 32 is closed, the brake fluid pressure is maintained when each of the valves 36A, 36B, 37A and 37B is closed. When valves 36A and 37A are open and valves 36B and 37B are closed, the brake fluid pressure is increased. When valves 36A and 37A are closed and the valves 36B and 37B are open, the brake fluid pressure is reduced. Brake fluid pressure passing through the branch fluid line 28a is prevented from acting as a reaction force on the brake pedal 25 because of the one way valve 35. While the traction control is conducted, if the brake pedal 25 is depressed, the fluid pressure of the multiplying means 26, which is substantially proportional to the depressed stroke of the brake pedal 25, is supplied as brake pressure to the rear brakes 21RR, 21RL through the one way valve 35. When implementing the anti-skid control, the valve 32 is closed and the valve 34 is open. Also, by duty controlling the valves 36A, 36B, 37A, 37B, 38A, 38B, 39A and 39B, brake fluid pressure can be maintained, increased, and reduced. The anti-skid control is accomplished independently with respect to the right and left front wheels and, on the other hand, is conducted uniformly on both the right and left rear wheels depending upon whether or not a rear wheel has a great tendency to lock up.

Because the anti-skid control is not per se directly related to this invention, the following description will be directed to only the slippage control for traction control as part of the control of the control unit USL.

The control unit USL is input with various signals, such as signals from wheel speed sensors 64–67, a brake signal from a brake switch 69 which is turned on when the brake pedal 25 is depressed, and an acceleration signal from an acceleration switch 68 which is turned on when an accelerator pedal 42 is depressed and turned off when it is released or in its returned position. The control unit USL comprises an input interface for receiving signals from the respective sensors, a microcomputer including a central processing unit (CPU), a read only memory (ROM) and a random access memory (RAM), an output interface, and an operating circuit which drives all of the valves 32, 34, 36A, 37A, 38A, 39A, 36B, 37B, 38B and 39B. The ROM stores a control program and maps necessary to execute the slippage control. On the other hand, the RAM stores data memories necessary to execute various controls.

It is to be noted that the value of slippage (which is hereinafter referred to as a slippage value) in the slippage control is established in this embodiment as a value of a difference between a drive wheel speed and a vehicle speed. The vehicle speed is an average speed of right and left driven wheel speeds. Accordingly, the larger the slippage value becomes, the greater is the tendency for the drive wheels to slip on the road surface.

The slippage control is accomplished by both controlling or reducing engine torque and controlling braking force applied to drive wheels. The slippage control accomplished by means of engine control is conducted only when a slippage value of one of the left and right drive wheels, larger than that of the other, becomes above a predetermined threshold slippage (SSE) which is hereinafter referred to as an engine torque control threshold slippage. The torque-controlled slippage control is performed in such a way to feedback control the engine output torque so that an averaged slippage or arithmetical mean slippage of actual slippage of the right and left drive wheels reaches a specific or target value (STE). Controlling the engine output torque may be accomplished in a well known manner, such as by adjusting the amount of intake air, by adjusting ignition timing, or by supplying an adjusted amount of fuel mixture. The engine control is terminated when acceleration is entirely stopped, or when the engine torque control threshold slippage (SEE) is reached by an actual slippage of either one of the right and left drive wheels.

The slippage control, which is accomplished by braking independently the right and left drive wheels, commences when an actual slippage of the drive wheel exceeds a specific predetermined threshold slippage (SSB), which is hereinafter referred to as a brake control threshold slippage, set greater than the engine torque control threshold slippage (SEE). The brake-controlled slippage control is performed in such a way to feedback control the braking pressure to the drive wheel so that an actual slippage of the drive wheel reaches a specific or target value (STB), set greater than the target value (STE) in the torque-controlled slippage control. The brake-controlled slippage control ceases when the engine control is terminated, when the accelerator pedal is depressed, and when an actual slippage of the drive wheel falls below a brake control threshold slippage (SEB), set greater than the engine torque control threshold slippage (SEE).

Each of the threshold slippage SSE and SSB for control commencement, the target slippage STE and STB for feedback control, and the threshold slippage SEE and SEB for control termination changes in accordance with a road surface resistance $\mu$. Practically, the smaller the road surface resistance $\mu$ is, the smaller each of the slippages SSE, SSB, STE, STB, SEE and SEB is set. Otherwise, in place of changing these specific slippages for variably conducting the slippage control, a control gain may be changed in accordance with a road surface resistance $\mu$. Also, the slippage control may be executed by the use of parameters or terms changed corresponding to road surface resistance $\mu$ which have been conventionally used.

Figure 2:
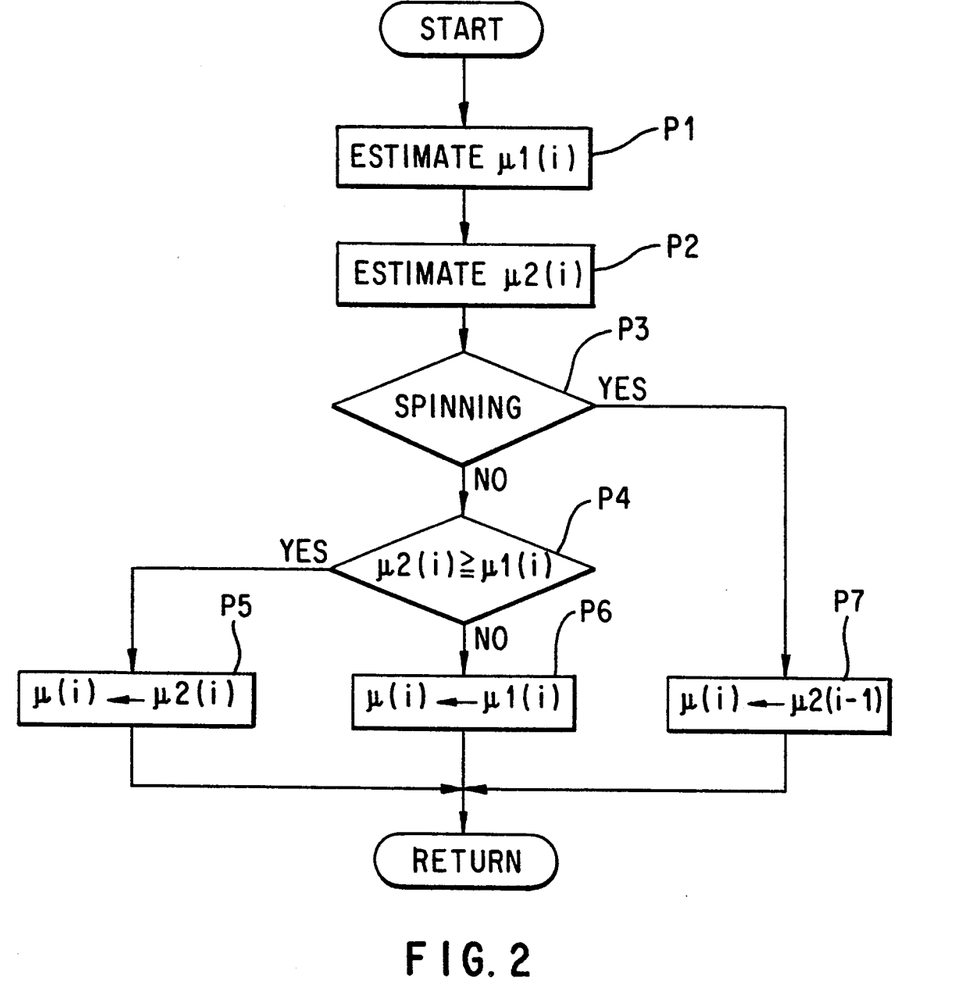
FIG. 2 is a flow chart illustrating a sequential routine of a road surface resistance estimation.

FIG. 2 is a flow chart illustrating the sequence routine of road surface resistance $\mu$ estimation utilized in the slippage control (traction control) for the control unit USL. In the first step P1, a current road surface resistance $\mu1(i)$ is estimated based upon a lateral gravitational acceleration of the vehicle, which is hereinafter referred to as a lateral road surface resistance. Subsequently, in step P2, a current road surface resistance $\mu2(i)$ is estimated based upon a rectilinear gravitational acceleration of the vehicle, which is hereinafter referred to as a rectilinear road surface resistance. These estimations of the lateral road surface resistance $\mu1(i)$ and the rectilinear road surface resistance $\mu2(i)$ will be described in detail later with respect to FIGS. 3 and 4.

In step P3, a decision is made as to whether or not the vehicle is spinning. With this embodiment, if a drive wheel rotation speed falls short of that of the driven wheels, then it is determined that the drive wheels are locked and that the vehicle is in a spinning condition. If, in step P3 it is determined that the vehicle is not spinning, then in step P4 another determination is made as to whether or not the rectilinear road surface resistance $\mu2(i)$ is greater or less than the lateral road surface resistance $\mu1(i)$. If the answer to this decision is "YES," this indicates that the rectilinear road surface resistance $\mu2(i)$ is greater than the lateral road surface resistance $\mu1(i)$. Then, in step P5, estimation is made of the rectilinear road surface resistance $\mu2(i)$ as an current effective road surface resistance $\mu(i)$ for the slippage control.

If the answer to the decision made in step P4 is "NO," then in step P6, the lateral road surface resistance $\mu1(i)$ is estimated as an current effective road surface resistance $\mu(i)$.

Basically, in this sequence, whichever of the lateral road surface resistance $\mu1(i)$ and the rectilinear road surface resistance $\mu2(i)$ is greater than the other is estimated as an effective road surface resistance $\mu(i)$ for the slippage control. However, if the answer to the decision made in step P3 is "YES," this indicates that there is no spin on the vehicle. Then, in step P7, a previously estimated rectilinear road surface resistance $\mu2(i-1)$ is used as an current effective road surface resistance $\mu(i)$. In other words, if there actually occurs vehicle spinning, a rectilinear road surface resistance $\mu2(i-1)$ which has been estimated prior to an occurrence of vehicle spin is utilized in the slippage control. This is because, when the vehicle is spinning, neither the lateral road surface resistance $\mu1(i)$ nor the rectilinear road surface resistance $\mu2(i)$ will accurately represent an actual road surface resistance. Hence, through the utilization of the previous rectilinear road surface resistance $\mu2(i-1)$ which reflects a state prior to the occurrence of vehicle spin, an estimation can be made which closely approximates that of an actual road surface resistance. It is to be understood that, in step P7, in lieu of the previous rectilinear road surface resistance $\mu2(i-1)$, utilization may be selectively made of a previous lateral road surface resistance $\mu1(i-1)$ and a previous rectilinear road surface resistance $\mu2(i-1)$.

Figure 3:
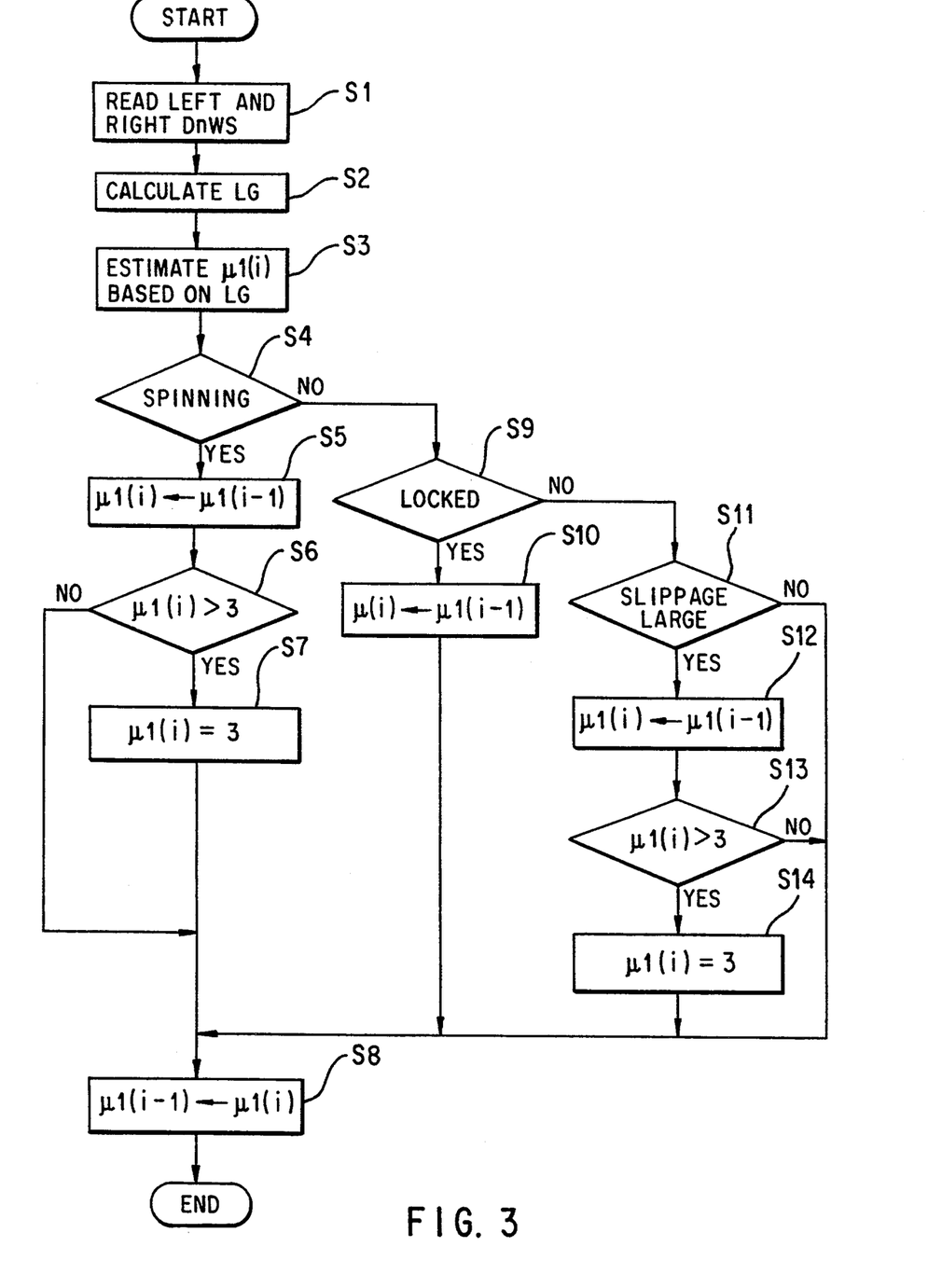
FIG. 3 is a flow chart illustrating the sequential routine of a first or lateral road surface resistance estimation.

FIG. 3 shows a flow chart illustrating a sequential routine of the estimation of a current lateral road surface resistance $\mu1(i)$ based on lateral gravitational acceleration. The detection of lateral gravitational acceleration is accomplished, in this example, on the basis of left and right driven wheel speeds, as will be explained later.

After reading in right and left driven wheel speeds (DnWS) in step S1, a lateral gravitational acceleration (LG) is calculated on the basis of the right and left driven wheel speeds (DnWS), in an appropriate manner described later, in step S2. In step S3, a current lateral road surface resistance $\mu1(i)$ is selected from a lateral resistance map with respect to lateral gravitational acceleration (LG) stored in the ROM, shown in Table I.

TABLE I

| LG | 0.10 | 0.25 | 0.40 | 0.55 | 0.70 |
|---|---|---|---|---|---|
| $\mu1$ | 1.0 | 2.0 | 3.0 | 4.0 | 4.0 |

As is apparent from the Table I, the lateral road surface resistance $\mu1$ is established so as to become higher with an increase in lateral gravitational acceleration (LG). Specifically, in this embodiment, a lateral road surface resistance $\mu1$ is set in four grades ranging from 1 (one), the lowest resistance, to 4 (four), the highest resistance.

After the determination of the lateral road surface resistance $\mu1(i)$, a decision is made in step S4 as to whether or not the vehicle is spinning. This decision is accomplished in the same manner as described in connection with step P3 of FIG. 2. If the answer to this decision is "YES," then in step S5, a previous lateral road surface resistance $\mu1(i-1)$, which has been estimated immediately prior to the occurrence of spinning of the vehicle in the previous sequence, is substituted as a lateral road surface resistance $\mu1(i)$ for the present sequence. Thereafter, in step S6, a decision is made as to whether or not the lateral road surface resistance $\mu1(i)$ is greater than 3 (three). If the answer to this decision is "NO," then, the lateral road surface resistance $\mu1(i)$ established in step S5 remains as a current lateral road surface resistance $\mu1(i)$. However, if the answer to this decision is "YES," then the lateral road surface resistance $\mu1(i)$ is replaced with 3 (three) for restriction of upper resistance in step S7.

If the answer to the decision made in step S4 is "NO" then a decision is made in step S9 as to whether or not the driven wheels are locked. If the answer to this decision is "YES," then in step S10, selection is made of the previous lateral road surface resistance $\mu1(i-1)$ as a current lateral road surface resistance $\mu1(i)$ in this sequence. If the answer to this decision is "NO," then, another decision is made in step S11 as to whether or not slippage of the drive wheels is greater than a specified value. If the answer to this decision is "YES," then in step S12, the previous lateral road surface resistance $\mu1(i-1)$ immediately prior to the occurrence of the excessive slippage of the drive wheels is used as a current lateral road surface resistance $\mu1(i)$. Subsequently, in step S13, a decision is made as to whether or not the lateral road surface resistance $\mu1(i)$ is greater than 3 (three). If the answer to this decision is "YES," then the lateral road surface resistance $\mu1(i)$ is replaced with 3 (three) for restriction of upper resistance in step S14.

Subsequent to the determination of the lateral road surface resistance $\mu1(i)$ in step S7, S10 or S14, and when the answer to the decision made in step S6, S11 or S13 is "NO," after replacing the estimated lateral road surface resistance $\mu1(i)$ in the current sequence as a previous lateral road surface resistance $\mu1(i-1)$ in a subsequent sequence in step S8, the routine ends.

Figure 4:
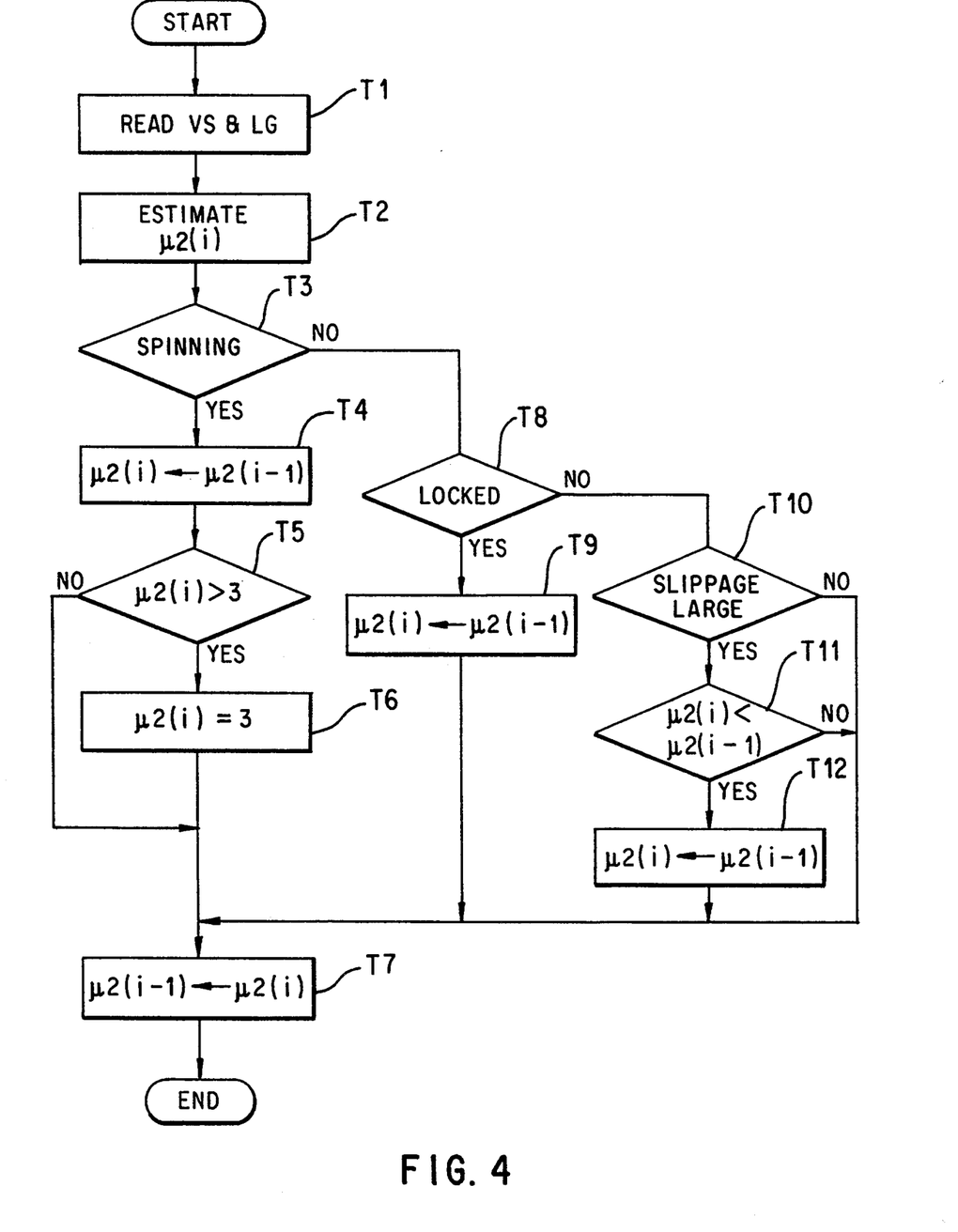
FIG. 4 is a flow chart illustrating the sequential routine of a second or rectilinear road surface resistance estimation.

FIG. 4 shows a flow chart illustrating a sequential routine of the estimation of rectilinear road surface resistance $\mu2$ based on vehicle speed and rectilinear gravitational acceleration.

After reading in a vehicle speed (VS) and a rectilinear gravitational acceleration (RG) in step T1, a current rectilinear road surface resistance $\mu2(i)$ is selected as a current rectilinear road surface resistance from a rectilinear resistance map with respect to rectilinear gravitational acceleration (RG) stored in the ROM, shown in Table II, in step T2.

As is apparent from Table II, this rectilinear road surface resistance $\mu2$ is graded in five steps, one step higher than the lateral road surface resistance $\mu1$, based on rectilinear gravitational acceleration (RG) and vehicle speed (VS). This is because although the lateral road surface resistance $\mu1$, defined based on lateral gravitational acceleration (LG), is considered to be serious for the running stability of vehicle, i.e. reduced slippage of the drive wheels, the rectilinear road surface resistance $\mu2$ defined based on rectilinear gravitational acceleration (RG) is considered to be primary. It is to be understood that the maximum road surface resistance $\mu$ may be established to be the same for rectilinear road surface resistance $\mu2$ and lateral road surface resistance $\mu1$.

TABLE II

| | 0 | | | RG | | | | | LARGE |
|---|---|---|---|---|---|---|---|---|---|
| 0 | 1.0 | 1.0 | 2.0 | 2.0 | 3.0 | 3.0 | 4.0 | 4.0 | 5.0 |
| | 1.0 | 1.0 | 2.0 | 2.0 | 3.0 | 4.0 | 4.0 | 5.0 | 5.0 |
| | 1.0 | 1.0 | 2.0 | 3.0 | 3.0 | 4.0 | 4.0 | 5.0 | 5.0 |
| VS | 1.0 | 1.0 | 2.0 | 3.0 | 4.0 | 4.0 | 5.0 | 5.0 | 5.0 |
| (Km/h) | 1.0 | 1.0 | 2.0 | 3.0 | 4.0 | 5.0 | 5.0 | 5.0 | 5.0 |
| | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| LARGE | 1.0 | 2.0 | 3.0 | 5.0 | 5.0 | 5.0 | 5.0 | 5.0 | 5.0 |

After the determination of the current rectilinear road surface resistance $\mu2(i)$, a decision is made in step T3 as to whether or not the vehicle is spinning. If the answer to this decision is "YES," then in step T4, a previous rectilinear road surface resistance $\mu2(i-1)$, which has been estimated immediately prior to the occurrence of spinning of the vehicle in the previous sequence, is used as a current rectilinear road surface resistance $\mu2(i)$ for the current sequence. Thereafter, in step T5, a decision is made as to whether or not the current rectilinear road surface resistance $\mu2$ is greater than 3 (three). If the answer to this decision is "NO," then the rectilinear road surface resistance $\mu2(i)$ established in step T4 remains as a current rectilinear road surface resistance $\mu2(i)$. However, if the answer to this decision is "YES," then the current rectilinear road surface resistance $\mu2(i)$ is replaced with and estimated as 3 (three) for restriction of upper resistance in step T6.

If the answer to the decision made in step T3 is "NO," then a decision is made in step T8 as to whether or not the driven wheels are locked. If the answer to this decision is "YES," then, in step T9, selection is made of a previous road surface resistance $\mu2(i-1)$ as a current rectilinear road surface resistance $\mu2(i)$ in this sequence. If the answer to this decision is "NO," then another decision is made in step T10 as to whether or not slippage of the drive wheels is greater than a specified value. If the answer to this decision is "YES," then a decision is made in step T11 as to whether or not the current rectilinear road surface resistance $\mu2(i)$ is less than the previous rectilinear road surface resistance $\mu2(i-1)$. If in fact the current rectilinear road surface resistance $\mu2(i)$ is less than the previous rectilinear road surface resistance $\mu2(i-1)$, then, the current rectilinear road surface resistance $\mu2(i)$ is replaced with the previous rectilinear road surface resistance $\mu2(i-1)$ in step T12.

Subsequent to the determination of the rectilinear road surface resistance $\mu2(i)$ in step T3, T9 or T12, or when the answer to the decision made in step T5, T10 or T11 is "NO," after replacing the estimated rectilinear road surface resistance $\mu2(i)$ in the current sequence as a previous rectilinear road surface resistance $\mu2(i-1)$ in a subsequent sequence in step T7, the routine goes to its end.

In this sequence, the rectilinear road surface resistance $\mu2$ is prohibited from being estimated too low through steps T11 and T12. If slippage of the drive wheels is greater than the specified value, i.e. the answer to the decision made in step T10 is "NO," then, sequence moves directly to step T7. In this instance, the rectilinear road surface resistance $\mu2(i)$ selected in step T2 is estimated as a current resistance without any value change.

Figure 5:
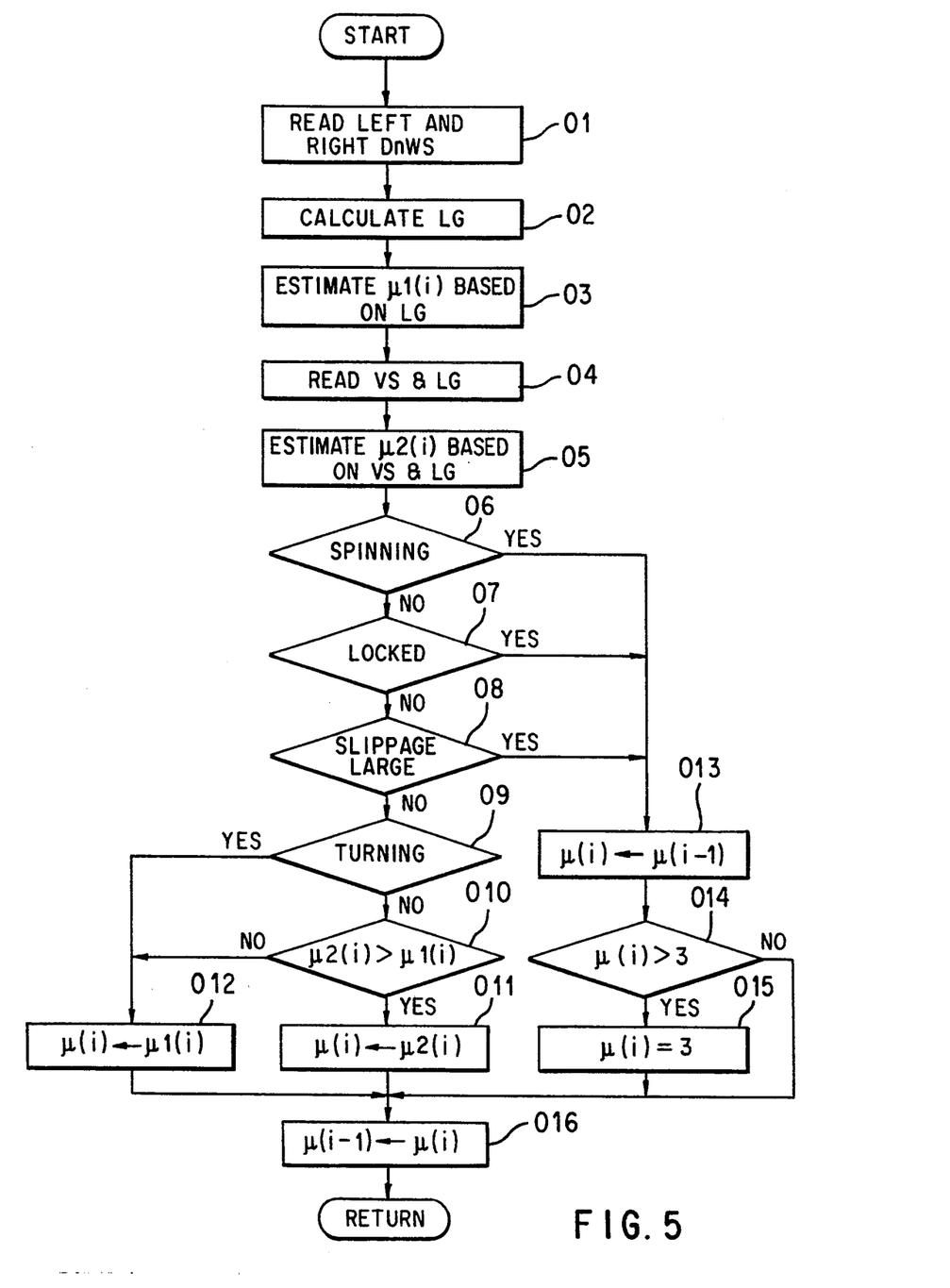
FIG. 5 is a flow chart illustrating another sequential routine of a road surface resistance estimation.

The sequence routine of road surface resistance $\mu$ estimation illustrated by the flow chart in FIG. 2 may be varied as shown by a flow chart in FIG. 5. In the sequence, lateral and rectilinear road surface resistances $\mu1$ and $\mu2$ are estimated in the same resistance estimation sequences as those shown in FIGS. 3 and 4, respectively.

In FIG. 5, after reading in right and left driven wheel speeds in step O1, a lateral gravitational acceleration (LG) is calculated in step O2, and a current lateral road surface resistance $\mu1(i)$ is selected from a lateral road surface resistance map in step O3. Thereafter, after reading in a vehicle speed (VS) and a rectilinear gravitational acceleration (RG) in step O4, a current rectilinear road surface resistance $\mu2(i)$ is selected from a rectilinear road surface resistance map in step O5.

Subsequently, various decisions are made in order in steps O6–O8. If all the answers to these decisions are "NO," i.e. the vehicle is not spinning, the driven wheels are not locked, and slippage of the drive wheels is not greater than a specific value, then, a decision is made in step O9 as to whether or not the vehicle is turning. If the answer to this decision is "YES," then, the lateral road surface resistance $\mu1(i)$ is estimated as a current effective road surface resistance $\mu(i)$ for use in slippage control in step O12. However, if the answer to the decision made in step O9 is "NO," then a decision is made in step O10 as to whether or not the rectilinear road surface resistance $\mu2(i)$ is greater than the lateral road surface resistance $\mu1(i)$. If the answer to this decision is "YES," then, the rectilinear road surface resistance $\mu2(i)$ is estimated as a current effective road surface resistance $\mu(i)$ for use in slippage control. However, if the answer to this decision is "NO," this indicates that the rectilinear road surface resistance $\mu2(i)$ is not greater than the lateral road surface resistance $\mu1(i)$; the lateral road surface resistance $\mu1(i)$ is estimated as a current effective road surface resistance $\mu(i)$ for use in slippage control in step O12.

If the answer to any one of the decisions made in steps O6, O7 and O8 is "YES," i.e when the vehicle is spinning, or when the driven wheels are locked up, or when slippage of the drive wheels is greater than the specific value, then after setting a previous effective road surface resistance $\mu(i-1)$ as a current effective road surface resistance $\mu(i)$ in step O13, another decision is made in step O14 as to whether or not the current road surface resistance $\mu(i)$ is greater than 3 (three). If the answer to this decision is "YES," then in step O15, the current road surface resistance $\mu(i)$ is replaced with 3 as an upper limitation. However, if the answer to the decision is "NO," the previously estimated road surface resistance remains.

Subsequent to the determination of the current effective road surface resistance $\mu(i)$ in step O11, O12 or O15, or when the answer to the decision made in step O14 is "NO," after replacing the current effective road surface resistance $\mu(i)$ as a previous effective road surface resistance $\mu(i-1)$ in a subsequent sequence in step O16, the final step in O16 orders another sequence.

Figure 6:
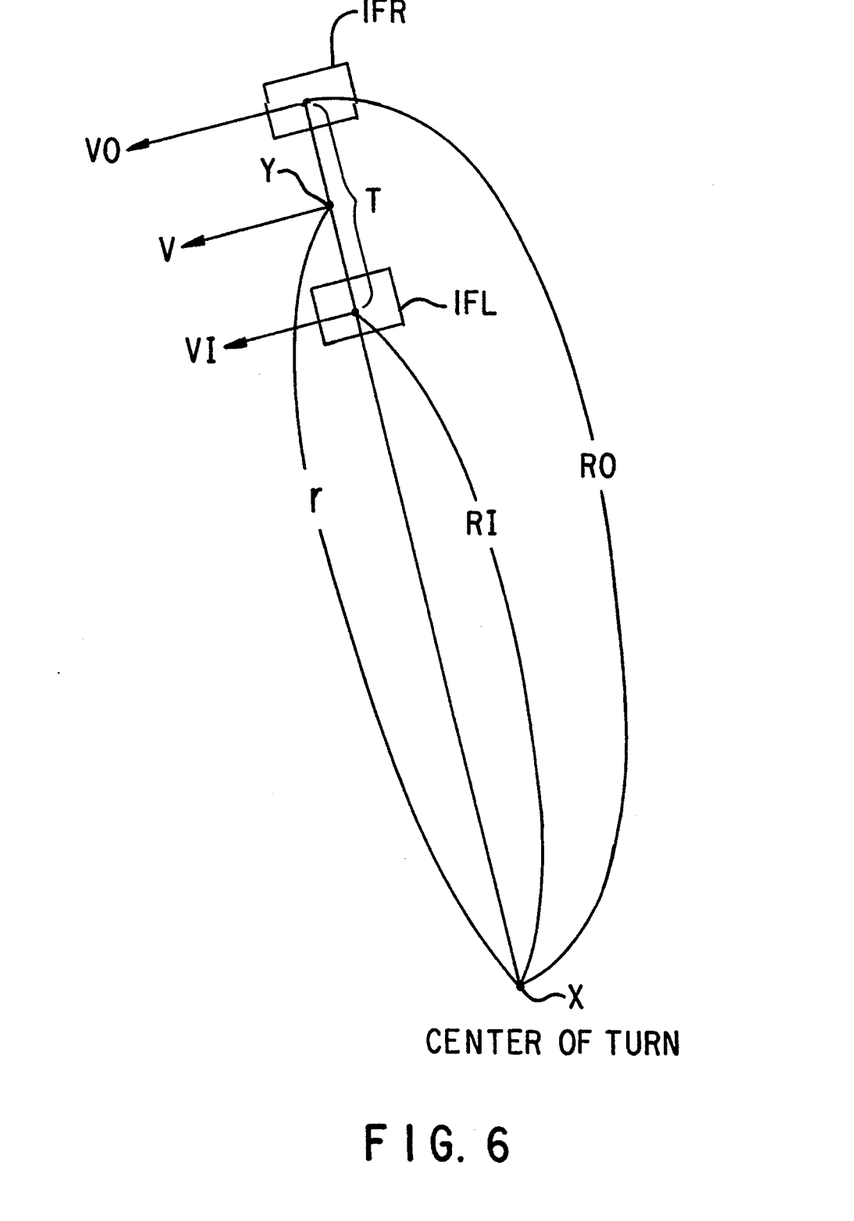
FIG. 6 is an explanatory illustration for calculating a lateral gravitational acceleration.

In order to explain how to calculate a lateral gravitational acceleration (LG) from driven wheel speeds, reference is made to FIG. 6, in which X represents the center of turn of the vehicle, RO represents the radius of turn of an outer wheel of the vehicle, RI represents the radius of turn of an inner wheel, T represents the tread between the right and left driven wheels, Y represents the center position of the tread, r represents the radius of turn of the center position of the tread Y, VO represents the rotational speed of the outer driven wheel during turning, VI represents the rotational speed of the inner driven wheel during turning, and V represents the speed of turn at the center position of the tread Y.

On the assumption of the above, a lateral gravitational acceleration (LG) is calculated from the following formula I:

$$LG = (VO^2 - VI^2)/2GT \qquad (I)$$

As apparent from Formula I, since the tread T is fixed, and G is the gravitational acceleration, if left and right driven wheel speeds in rotation are known, the lateral gravitational acceleration (LG) is calculated from Formula I.

The following Formulas II through IIX may be used for the calculation of Formula I.

$$RO = RI + T \qquad (II)$$

$$RI:RO = VI:VO \qquad (III)$$

$$RI = T \times VI/(VO - VI) \qquad (IV)$$

$$V = (VO + VI)/2 \qquad (V)$$

$$r = RI + T/2 \qquad (VI)$$

$$r = T(VI + VO)/2(VO - VI) \qquad (VII)$$

$$LG = V^2/r \cdot 1/G \qquad (IIX)$$

As is clear in FIG. 6, Formulas II, III, V and VI are directly evident. Formula IV is derived from Formulas II and III, and Formula VII is derived by substituting Formula IV into Formula VI. Since lateral gravitational acceleration (LG) is expressed by Formula IIX, through the substitution of Formulas V and VII into Formula IIX, then Formula I is obtained.

It is to be understood that a lateral gravitational acceleration and/or a rectilinear gravitational acceleration may be detected by gravitational acceleration sensors well known in the art. In addition, slippage may be substituted by a ratio between a drive wheel speed and a vehicle speed. For example, the slippage can be appropriately established by means of a drive wheel speed/a vehicle speed, or (a drive wheel speed—a vehicle speed)/a vehicle speed. The slippage control is, of course, accomplished through either engine control or brake control.

It is to be noted that although the present invention has been described with respect to preferred embodiments thereof, various other embodiments and variants may occur to those skilled in the art. Such other embodiments and variants falling within the scope and spirit of the invention are intended to be covered by the following claims.

What is claimed is:

1. A slippage control system for an automotive vehicle, in which wheel drive torque is controlled to prevent the drive wheels from slippage excessively on a road and is regulated in accordance with road surface resistances, said slippage control system comprising:

slippage detecting means for detecting slippage of at least one of said drive wheels;

lateral gravitational acceleration detecting means for detecting a lateral gravitational acceleration of the automotive vehicle while it is running;

rectilinear gravitational acceleration detecting means for detecting a rectilinear gravitational acceleration of the automotive vehicle while it is running;

control means for determining when the automotive vehicle is spinning, estimating a first road surface resistance on the basis of the lateral gravitational acceleration of the automotive vehicle detected by said lateral gravitational acceleration detecting means, estimating a second road surface resistance on the basis of the rectilinear gravitational acceleration of the automotive vehicle detected by said rectilinear gravitational acceleration detecting means, and obtaining an effective road surface resistance from one of said first and second road surface resistances and an alternative road surface resistance used when said automotive vehicle is spinning; and torque regulating means for decreasing wheel drive torque based on the slippage of said at least one driving wheel detected and the effective road surface resistance obtained.

2. A slippage control system as defined in claim 1, wherein said control means selects said first road surface resistance as the effective road surface resistance when the automotive vehicle is turning.

3. A slippage control system as defined in claim 1, wherein said control means selects one of said first and second road surface resistances, depending upon which is higher, as the effective road surface resistance.

4. A slippage control system as defined in claim 3, wherein said control means maintains the effective road surface resistance as selected prior to determination that the automotive vehicle is spinning.

5. A slippage control system as defined in claim 4, wherein said control means monitors a drive wheel speed and a driven wheel speed and compares the drive wheel speed and the driven wheel speed to determine whether the automotive vehicle is spinning.

6. A slippage control system as defined in claim 4, wherein said control means limits said effective road surface resistance estimated prior to determination that the automotive vehicle is spinning to a predetermined upper limit resistance.

7. A slippage control system as defined in claim 4, wherein said slippage detecting means further monitors a drive wheel speed and a vehicle speed to detect a difference therebetween as an indication of slippage of the automotive vehicle.

8. A slippage control system as defined in claim 1, wherein when said slippage detecting means detects slippage of the automotive vehicle which is larger than a predetermined slippage, an effective road surface resistance, estimated prior to detection of said slippage which is larger than the predetermined slippage of the automotive vehicle, is maintained.

9. A slippage control system as defined in claim 8, wherein said control means monitors driven wheel speeds of both driven wheels of the automotive vehicle and calculates an average speed of said driven wheel speeds as said vehicle speed.

10. A slippage control system as defined in claim 8, wherein said control means limits said effective road surface resistance estimated prior to a detection of the slippage to a predetermined upper limit resistance.

11. A slippage control system as defined in claim 1, wherein said control means selects the first road surface resistance, estimated prior to an occurrence of spinning of the automotive vehicle and an occurrence of excessive slippage of the at least one of the drive wheels, as being an effective first road surface resistance.

12. A slippage control system as defined in claim 11, wherein said control means limits said first road surface resistance to a predetermined upper limit resistance.

13. A slippage control system as defined in claim 1, wherein said control means selects the second road surface resistance, estimated prior to an occurrence of spinning of the automotive vehicle and an occurrence of excessive slippage of the at least one of the drive wheels, as being an effective second road surface resistance.

14. A slippage control system as defined in claim 13, wherein said control means limits said second road surface resistance to a predetermined upper limit resistance.

15. A slippage control system as defined in claim 1, wherein said lateral gravitational acceleration detecting means detects a lateral gravitational acceleration of the automotive vehicle based on speeds of driven wheels.

16. A slippage control system as defined in claim 15, wherein said lateral gravitational acceleration of the automotive vehicle (LG) is calculated from the following formula:

$$LG = (VO^2 - VI^2)/2GT$$

where VO is a rotational speed of an outer driven wheel during turning, VI is a rotational speed of an inner driven wheel during turning, T is a tread spacing between the inner and outer driven wheels, and G is gravitational acceleration.

17. A slippage control system as defined in claim 1, wherein said rectilinear gravitational acceleration detecting means detects a rectilinear gravitational acceleration of the automotive vehicle based on speeds of driven wheels.

18. A slippage control system as defined in claim 17, wherein said rectilinear gravitational acceleration of the automotive vehicle is calculated as a differentiation of said speeds of the driven wheels.

19. A slippage control system as defined in claim 1, wherein said control means includes a memory of a plurality of predetermined grades of the first road surface resistance which are selected in accordance with the lateral gravitational acceleration of the automotive vehicle detected.

20. A slippage control system as defined in claim 1, wherein said control means includes a memory of a plurality of predetermined grades of the second road surface resistance which are selected in accordance with the rectilinear gravitational acceleration of the automotive vehicle detected.

21. A slippage control system as defined in claim 1, and further comprising a vehicle speed sensor for detecting a speed of the automotive vehicle, and wherein said control means includes a memory of a plurality of predetermined grades of the second road surface resistance which are selected in accordance with the rectilinear gravitational acceleration and the speed of the automotive vehicle detected.

* * * * *